United States Patent [19]

Gruber et al.

[11] 4,092,468

[45] May 30, 1978

[54] MANUFACTURE OF OLEFIN POLYMERS

[75] Inventors: Wolfgang Gruber, Frankenthal; Hans Frielingsdorf, Bad Durkheim; Heinz Mueller-Tamm, Ludwigshafen, all of Germany

[73] Assignee: BASF Aktiengesellschaft, Ludwigshafen am Rhein, Germany

[21] Appl. No.: 761,259

[22] Filed: Jan. 21, 1977

[30] Foreign Application Priority Data

Feb. 6, 1976 Germany .............................. 2604549

[51] Int. Cl.$^2$ .......................... C08F 4/02; C08F 4/24; C08F 4/78; C08F 10/00
[52] U.S. Cl. .................................... 526/105; 252/430; 252/451; 252/452; 526/106; 526/352
[58] Field of Search ................ 526/105, 106; 252/430, 252/451, 452

[56] References Cited

U.S. PATENT DOCUMENTS

| | | |
|---|---|---|
| 3,081,286 | 3/1963 | McKinnis ............... 526/105 |
| 3,639,378 | 2/1972 | Long .................... 526/105 |
| 3,639,381 | 2/1972 | Craven .................. 526/105 |
| 3,759,918 | 9/1973 | Yamaguchi et al. ...... 526/105 |
| 3,767,635 | 10/1973 | Yamaguchi et al. ..... 526/105 |
| 3,878,179 | 4/1975 | Hogan ................... 526/105 |
| 3,919,185 | 11/1975 | Takebe et al. .......... 526/105 |
| 3,947,433 | 3/1976 | Witt ..................... 526/105 |
| 3,956,257 | 5/1976 | Hogan ................... 526/105 |
| 3,959,178 | 5/1976 | Hogan ................... 526/105 |
| 4,025,707 | 5/1977 | Hogan ................... 526/105 |
| 4,037,042 | 7/1977 | Mueller-Tamm et al. .. 526/106 |
| 4,042,770 | 8/1977 | Bachl et al. ........... 526/106 |
| 4,048,414 | 9/1977 | Frielingsdorf et al. ... 526/105 |

*Primary Examiner*—Alan Holler
*Attorney, Agent, or Firm*—Keil, Thompson & Shurtleff

[57] ABSTRACT

A process for the manufacture of olefin polymers by polymerizing α-monoolefins of 2 to 8 carbon atoms by means of a catalyst which is obtained from a silicon-containing material (component a), an organo-metallic compound containing alkyl groups (component b) and a chromium compound (component c), wherein the catalyst employed is obtained by (1) first bringing into contact (1.1) an alkogel (component a) of the empirical formula $SiO_2 \cdot m\ Al_2O_3 \cdot n\ ROH$, where m is a number from 0 to 2, n is a number such that the content of ROH in the alkogel is from 1 to 85 per cent by weight and R is alkyl of 3 to 8 carbon atoms, and (1.2) an aluminum compound containing certain alkyl groups (component b), with intimate mixing, to form a solid-phase reaction product, (2) then bringing into contact (2.1) the solid-phase reaction product obtained from stage (1) and (2.2) a solution of a particular chromium compound (component c), with intimate mixing and evaporation of the solvent, and (3) finally heating the product, obtained from stage (2), in an anhydrous stream of gas containing oxygen, with the proviso that the product obtained from stage (1) or from stage (2) is dried and comminuted before it is used further in the next stage. This process makes it possible to influence the essential properties of the polymers in relatively diverse ways, in the desired direction, by relatively slight modifications of the catalyst.

8 Claims, No Drawings

MANUFACTURE OF OLEFIN POLYMERS

The present invention relates to a process for the manufacture of olefin polymers by polymerizing α-monoolefins of 2 to 8 carbon atoms at from 60° to 160° C and olefin pressures of from 0.5 to 40 bars by means of a catalyst which is obtained from a silicon-containing compound (component $a$), an organo-metallic compound containing alkyl groups (component $b$) and a chromium compound (component $c$).

Several embodiments of processes of this type are known; these conventional processes share the feature that the catalyst used is obtained by bringing together a silicate carrier (as component $a$), which may be charged with a chromium compound (as component $c$), with an organo-metallic compound containing alkoxide groups (as component $b$), to give a catalyst which in itself contains functional alkoxide groups. These alkoxide groups serve, for example, to regulate the molecular weight of the polymers (cf. German Laid-Open Application DOS No. 2,240,246, German Laid-Open Application DOS No. 2,329,738 and U.S. Pat. No. 3,324,101) and to alter the activity of the catalyst (cf. German Laid-Open Application DOS No. 1,926,346) or influence the "memory effect" of the polymers (cf. German Published Application DAS No. 2,052,573).

It is an object of the present invention to provide, for the process defined at the outset, a catalyst which is inherently "flexible", ie. which is simple to modify and makes it possible to influence, through such modifications, essential properties of the polymers, in the desired direction, for example to increase the density, melt index and G-modulus simultaneously, or to lower them simultaneously. It is a further object to provide a catalyst which is able to give polymers which are particularly suitable for the manufacture of relatively small moldings by the blow-molding process, ie. polymers which have markedly good flow, and which give hollow articles without, or virtually without, melt fracture or weld lines, which articles furthermore exhibit high stress crack resistance.

We have found that this object is achieved by providing a catalyst which has been obtained by first combining a particular alkogel (as component ($a$)) with a particular organoaluminum compound containing alkyl groups (as component ($b$)) and then with a particular chromium compound (as component ($c$)) under particular conditions, and heating the resulting product in an oxygen-containing stream of gas at a high temperature.

Accordingly, the present invention relates to a process for the manufacture of olefin polymers by polymerizing α-monoolefins of 2 to 8 carbon atoms at from 60° to 160° C, especially from 80° to 110° C, and olefin pressures of from 0.5 to 40, especially from 4 to 15, bars, by means of a catalyst obtained from a silicon-containing material (component $a$), an organometallic compound containing alkyl groups (component $b$) and a chromium compound (component $c$), wherein the catalyst employed is obtained by (1) first bringing into contact
(1.1) an alkogel (component $a$) of the empirical formula $$SiO_2 \cdot m\ Al_2O_3 \cdot n\ ROH$$

where $m$ is a number of 0 to 2, especially from 0 to 0.5, $n$ is a number such that the content of ROH in the alkogel is from 1 to 85, especially from 5 to 20, percent by weight and R is alkyl of 3 to 8 carbon atoms, especially isoalkyl of 3 to 5 carbon atoms and
(1.2) an aluminum compound containing alkyl groups (component $b$) of the general formula $$R'_p Al(OR'')_{3-p}$$

where R' is alkyl of 1 to 8 carbon atoms, especially alkyl of 1 to 4 carbon atoms, R'' is open-chain alkyl of 1 to 8 carbon atoms or cyclic alkyl of 5 to 8 carbon atoms and $p$ is a number from 1 to 3, especially from 2 to 3, with intimate mixing, to form a solid-phase reaction product,
(2) then bringing into contact
(2.1) the solid-phase reaction product obtained from stage (1) and
(2.2) a solution of a chromium compound (component $c$), which compound is chromium trioxide or a chromium compound which is converted to chromium trioxide under the conditions of stage (3), with intimate mixing and evaporation of the solvent, and (3) finally keeping the product obtained from stage (2) in an anhydrous stream of gas, containing oxygen at a concentration of more than 10 percent by volume, for from 10 to 400 minutes, especially from 60 to 300 minutes, at from 600° to 1,000° C, especially from 700° to 950° C, with the provisos that (I) the catalyst contains from 0.1 to 10, especially from 0.5 to 5, parts by weight of component $b$ (calculated as aluminum) and from 0.3 to 10, especially from 1 to 5, parts by weight of component $c$ (calculated as chromium trioxide) per 100 parts by weight of component $a$ (calculated as silicon dioxide), and (II) that the product obtained from stage (1) or from stage (2) is dried and comminuted, before being used further in the next stage, until it no longer loses weight in the course of 30 minutes at 100° C under a pressure of 10 mm Hg and has attained a particle diameter of from 20 to 2,000 μm, especially from 50 to 300 μm.

The following points of detail relating to the new catalyst to be employed in the process of the invention may be noted:

It is manufactured in three stages referred to above and in the text which follows as (1), (2) and (3).

(1) FIRST STAGE

In this first stage, the alkogel (component $a$) is brought into contact with the aluminum compound containing alkyl groups (component $b$).

For this stage, an advantageous method is, for example, the following: the starting material is the alkogel as such, or a suspension or slurry containing from 5 to 40, preferably from 10 to 35, percent by weight of the alkogel, and a solution containing from 1 to 25, preferably from 2 to 10, percent by weight of the aluminum compound, suitable suspending or slurrying media and solvents being, in particular, hydrocarbons, above all relatively low-boiling alkane hydrocarbons, eg. pentanes, hexanes, heptanes or gasolines. Thereafter, the components are combined in such a ratio as to give the desired weight ratio of alkogel to aluminum compound. In general, they are combined by adding the aluminum component to the alkogel component, since this is a more practical procedure than the converse, though the latter is also possible. After combination, the solid phase is isolated. This may be done particularly advantageously by evaporating off the volatile constituents, advantageously whilst constantly keeping the treated material homogeneous. Rotary evaporators, operating under pressure of from 0.01 to 760 mm Hg have, for example, proved suitable for this purpose.

(2) SECOND STAGE

In this second stage, the solid-phase reaction product obtained from stage (1) is brought into contact with the chromium compound.

It has been found that in this stage it is generally advantageous to charge the product obtained from stage (1) with the desired amount of chromium by treatment with a solution containing from 0.05 to 5 percent by weight of chromium trioxide in an alkanone of from 3 to 5 carbon atoms or a solution containing from 0.05 to 15 percent by weight of a chromium compound which is converted to chromium trioxide under the conditions of stage (3), in an alkanol of 1 to 4 carbon atoms (the water content of the solvent used being, in each case, not more than 20 percent by weight and preferably not more than 5 percent by weight), and evaporation of the solvent. Specifically, a suitable method is to suspend the product, obtained from stage (1), in the solution of chromium, trioxide or of the chromium compound converted to chromium trioxide under the conditions of stage (3) (the amounts being so chosen as to give the desired ratio of alkogel (component $a$) to chromium compound (component $c$)) and to evaporate the volatile constituents of the batch, ie. alkanone or alkanol and, where relevant, water, with continuous very homogeneous mixing of the batch. It is most advantageous to work under pressures of from 10 to 760 mm Hg.

A step of the manufacture of the new catalyst, which is integrated with stage (1) or stage (2), is to dry and comminute the product obtained from stage (1) or from stage (2), before it is used further in the next stage, until it no longer loses weight in the course of 30 minutes at 100° C under a pressure of 10 mm Hg and a particle diameter of from 20 to 2,000 $\mu$m has been reached. In carrying out this step, it is generally advantageous to dry the material first and then to comminute it. Drying may be effected by appropriate conventional methods, eg. in a rotary evaporator, if appropriate under reduced pressure, and does not exhibit any peculiarities. The same general remarks apply to the comminution.

(3) THIRD STAGE

This stage serves for the activation of the catalyst; it can be carried out in the relevant customary manner, ie. in particular under conditions which ensure that in the finished catalyst the chromium is at least partially present in the hexavalent state. Appropriate procedures are disclosed, for example, in German Laid-Open Application DOS No. 1,520,467, page 3, line 11 to page 4, line 3.

It should be noted that essentially the peculiarity of the process of the invention resides in the new catalyst employed.

Provided this catalyst is employed, the process can be carried out in virtually all relevant conventional technological embodiments, ie. as a batchwise, cyclic or continuous process, which processes may be, for example, a suspension polymerization, solution polymerization or dry-phase polymerization, though the first and last of these are the most advantageous. The said technological embodiments, ie. the technological variants of the Phillips polymerization of olefins, are well known from the literature (the basic content of German Pat. No. 1,051,004 and the subsequently disclosed further developments thereof) and from practical experience, so that further details are superfluous.

However, it remains to be recorded that the new process may be used for homopolymerizing and copolymerizing α-monoolefins, especially of 2 to 6 carbon atoms; it is particularly suitable for the manufacture of homopolymers of ethylene. Where copolymers of ethylene with α-monoolefins, or homopolymers of higher α-monoolefins are manufactured, such α-monoolefins are, above all, propene, 1-butene, 4-methyl-1-pentene, 1-hexane and 1-octene. The use of hydrogen as a molecular weight regulator in the process of the invention is generally not necessary, though, if desired, relatively small amounts of such regulators can be present. The flexibility of the new catalysts is a particular advantage. As the relative amount of aluminum compound (component $b$) employed in stage (1) of the manufacture of the catalyst is increased, polymers of increasing density, increasing melt index and increasing G-modulus are obtained.

In carrying out the polymerization by means of the new catalysts, a further substantial advantage can be gained through the fact that the new catalysts can have a particularly high productivity. In that case, the catalyst constituents in the polymer are present in such small amount that they do not interfere and their removal, which would require a separate process step, can generally be dispensed with.

As regards the constituents of the new catalysts, the following should be noted:

(1) A particular alkogel is employed in stage (1).

Alkogels of this type can be manufactured easily by starting from a silicic acid hydrogel containing from 10 to 25, preferably from 12 to 20 and especially from 14 to 20, percent by weight of solids (calculated as silicon dioxide), replacing the water in the hydrogel by an alcohol of the formula ROH defined above and, if required or desired, bringing the alcohol content of the alkogel ultimately to the desired value by evaporating off a part of the alcohol (at elevated temperature and under reduced pressure).

The following further details should be noted:

Silicic acid hydrogels having the relatively high solids content specified above have been disclosed and do not require more detailed discussion here. However, it is to be emphasized that for the purposes of the present invention such hydrogels are particularly suitable if they have been manufactured by a process as described in German Laid-Open Application DOS No. 2,103,243. It should also be mentioned that silicic acid hydrogels suitable for the purpose of the present invention are to be understood as silicic acid hydrogels in the narrower sense, ie. coagulated silicic acid containing water, as well as corresponding hydrogels in which part of the silicon is replaced by aluminum, and which correspond to the empirical formula $SiO_2 \cdot m\ Al_2O_3 \cdot x\ H_2O$ (where $m$ is a number not greater than 2, in particular not greater than 0.5, and $x$ stands for the conventional content of water in silicic acid hydrogels, but with the proviso that on replacing the water by an alcohol an alkogel which corresponds to the empirical formula $SiO_2 \cdot m\ Al_2O_3 \cdot n\ ROH$ defined above can ultimately be obtained).

The replacement of the water in the silicic acid hydrogels by the alcohols ROH defined above may be effected in conventional extraction equipment. Soxhlet extractors or column extractors are examples of suitable equipment. Examples of suitable alcohols are tert.-butanol, i-propanol, ethanol and methanol, especially i-propanol and tert.-butanol. Of course the alcohol component of the alkogel may consist of one or more of the individual compounds suitable for the purpose, but in each case the alcohol component should, prior to the extraction, contain less than 3, and preferably less than 1, percent by weight of water.

In the course of the first stage of the manufacture of the new catalysts, the alkogel (component a) is brought into contact with a particular aluminum compound (component b). Examples of suitable aluminum compounds are aluminum trimethyl, aluminum triethyl, aluminum triisobutyl, aluminum trioctyl, diethyl-aluminum ethoxide and ethyl-aluminum diethoxide. The aluminum component may of course consist of one or more of the appropriate compounds.

(2) The chromium compounds to be employed in stage (2) are above all chromium trioxide, but also soluble salts of trivalent chromium with an organic or inorganic acid, eg. the acetate, oxalate and nitrate; salts of such acids which, on activation, i.e. in stage (3), are converted to chromium trioxide without leaving any other residue, are particularly suitable. It is also possible to employ chromium compounds in form of chelates, eg. chromium acetylacetonate. Examples of alkanol solvents which have proved suitable are tert.-butanol, i-propanol, ethanol and methanol. Amongst the alkanones, acetone has proved particularly suitable.

EXAMPLE

A) Manufacture of the new catalyst (1) First Stage

An alkanol is first manufactured by starting from a silicic acid hydrogel ($SiO_2 \cdot x\ H_2O$) containing 15 percent by weight of solids (calculated as silicon dioxide) and extracting water from this hydrogel by means of anhydrous isopropanol in a Soxhlet extractor until the alcohol no longer takes up any water. The material is then kept at 100° C under a pressure of 20 mm Hg until the alkogel (component a) has a residual isopropanol content of 15 percent by weight.

68.1 g of the alkogel are then suspended in 200 ml of hexane and combined with a solution of 12.7 g of aluminum triethyl (component b) in 250 ml of heptane, whilst stirring, the constituents being brought together sufficiently slowly to keep the temperature of the batch constantly at from 20° to 40° C. The mixture is then evaporated at 100° C to constant weight, the pressure being reduced down to 10 mm Hg, after which the product is milled. The weight ratio of component a (calculated as $SiO_2$) to component b (calculated as aluminum) in the resulting product is 100 : 4.

(2) Second stage

A solution of 0.77 g of chromium-(III) nitrate nonahydrate (component c) in 35 ml of ethanol (which contains 2 percent by weight of water) is added to 10 g of the product obtained in stage (1), which has a particle diameter of from 40 to 300 μm, this product having been introduced into a rotary evaporator, and the solvent is then evaporated off whilst intimately mixing the constituents by virtue of the action of the rotary evaporator. The highest temperature used is 70° C, and the lowest pressure used is 20 mm Hg. The product formed has a weight ratio of component a (calculated as $SiO_2$) to component c (calculated as $CrO_3$) of 100 : 2.

(3) Third stage

To carry out the activation, the product obtained from stage (2) is kept at 800° C in a stream of anhydrous oxygen (producing a fluidized bed) for 120 minutes, and is then flushed for 2 hours with pure nitrogen at room temperature.

B) POLYMERIZATION

The polymerization is carried out continuously in a stirred reactor of 190 l capacity. During the polymerization, the amounts of suspending medium introduced and removed (each equal to 12 kg of isopentane/hour), the concentration of the monomeric ethylene dissolved in the suspending medium (3.0 percent by weight; corresponding to an ethylene pressure of 8.7 bars) and the temperature (103° C) are regulated to keep the stated values constant. In continuous stationary-state operation, 1 g/hour of catalyst is introduced and 5,020 g/hour of polyethylene are withdrawn; the polyethylene has a high load melt index (ie. an MFI 190/20 [g/10 minutes], according to ASTM 1238-65 T) of 35.

We claim:

1. A process for the manufacture of an olefin polymer by polymerizing one or more α-monoolefins of 2 to 8 carbon atoms at from 60° to 160° C, and an olefin pressure of from 0.5 to 40 bars, by means of a catalyst obtained from a silicon-containing material (component a), an organo-metallic compound containing alkyl groups (component b) and a chromium compound (component c), wherein the catalyst employed is obtained by (1) first bringing into contact (1.1) an alkogel (component a) of the empirical formula $SiO_2 \cdot m\ Al_2O_3 \cdot n\ ROH$ where m is a number from 0 to 2, n is a number such that the content of ROH in the alkogel is from 1 to 85 percent by weight and R is alkyl of 3 to 8 catbon atoms, said alkogel having been prepared from a silicic acid hydrogel containing from 10 to 25 percent by weight of solids, calculated as silicon dioxide, by replacing the water in the hydrogel by an alcohol of the formula ROH defined above, and (1.2) an aluminum compound containing alkyl groups (component b) of the general formula $R'_p Al(OR'')_{3-p}$ where R' is alkyl of 1 to 8 carbon atoms, R" is open-chain alkyl of 1 to 8 carbon atoms or cyclic alkyl of 5 to 8 carbon atoms and p is a number from 1 to 3, with intimate mixing, to form a solid-phase reaction product, (2) then bringing into contact (2.1) the solid-phase reaction product obtained from stage (1) and (2.2) a solution of a chromium compound (component c), which compound is chromium trioxide or a chromium compound which is converted to chromium trioxide under the conditions of stage (3), with intimate mixing and evaporation of the solvent, and (3) finally keeping the product obtained from stage (2) in an anhydrous stream of gas, containing oxygen at a concentration of more than 10 percent by volume, for from 10 to 400 minutes, at from 600° to 1,000° C, with the proviso that (I) the catlyst contains from 0.1 to 10 parts by weight of component b (calculated as aluminum) and from 0.3 to 10 parts by weight of component c (calculated as chromium trioxide) per 100 parts by weight of component a (calculated as silicon dioxide), and (II) that the product obtained from stage (1) or from stage (2) is dried and comminuted, before being used further in the next stage, until it no longer loses weight in the course of 30 minutes at 100° C under a pressure of 10 mm Hg and has attained a particle diameter of from 20 to 2,000 μum.

2. A process as claimed in claim 1, wherein the finely divided alkogel has a particle diameter of from 40 to 300 μum, pore volume of from 1 to 2.5 cm³/g, and a surface area of from 300 to 600 m²/g.

3. A process as claimed in claim 1, wherein the finely divided alkogel has the formula $SiO_2 \cdot mAl_2O_3 \cdot nROH$ where m is a number from 0 to 0.5, n is a number such that the content of ROH in the alkogel is from 5 to 20 percent by weight and R is isoalkyl of 3 to 5 carbon atoms.

4. A process as claimed in claim 1, wherein in the formula of the aluminum compound containing alkoxide groups, R' is alkyl of 1 to 4 carbon atoms, R" is open-chain alkyl of 1 to 8 carbon atoms or cyclic alkyl of 5 to 8 carbon atoms and p is 2 or 3.

5. A process as claimed in claim 1, wherein the product from stage (2) is kept in stage (3) for from 60 to 300 minutes at from 700° to 950° C in the anhyrous stream of gas containing oxygen.

6. A process as claimed in claim 1, wherein the catalyst contains from 0.5 to 5 parts by weight of component (b) (calculated as aluminum) and from 1 to 5 parts by weight of component (c) (calculated as chromium trioxide) per 100 parts by weight of component (a) (calculated as silicon dioxide).

7. A process as claimed in claim 1, wherein ethylene is homopolymerized.

8. A process as claimed in claim 1 carried out at a temperature of from 80° to 110° C and an olefin pressure of from 4 to 15 bars.

* * * * *

UNITED STATES PATENT AND TRADEMARK OFFICE
CERTIFICATE OF CORRECTION

PATENT NO. : 4,092,468
DATED : May 30, 1978
INVENTOR(S) : WOLFGANG GRUBER et al

It is certified that error appears in the above-identified patent and that said Letters Patent are hereby corrected as shown below:

Col.6, line 66, "catlyst" should read -- catalyst --.

Col.7, line 10, "µum" should read -- µm -- line 13, "µum" should read -- µm --

Signed and Sealed this

Nineteenth Day of December 1978

[SEAL]

Attest:

RUTH C. MASON
Attesting Officer

DONALD W. BANNER
Commissioner of Patents and Trademarks